United States Patent
Khanna et al.

(10) Patent No.: US 10,956,345 B2
(45) Date of Patent: Mar. 23, 2021

(54) ENHANCED DIRECTED SYSTEM MANAGEMENT INTERRUPT MECHANISM

(71) Applicant: Intel Corporation, Santa Clara, CA (US)

(72) Inventors: Gaurav Khanna, Hillsboro, OR (US); Prashant Sethi, Folsom, CA (US); Venkatesh Ramamurthy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 15/088,429

(22) Filed: Apr. 1, 2016

(65) Prior Publication Data
US 2017/0286334 A1 Oct. 5, 2017

(51) Int. Cl.
*G06F 13/24* (2006.01)
*G06F 1/3206* (2019.01)
*G06F 9/4401* (2018.01)

(52) U.S. Cl.
CPC ............ *G06F 13/24* (2013.01); *G06F 1/3206* (2013.01); *G06F 9/4418* (2013.01)

(58) Field of Classification Search
CPC ....... G06F 1/3206; G06F 13/24; G06F 9/4418
See application file for complete search history.

(56) References Cited

U.S. PATENT DOCUMENTS

| | | | | |
|---|---|---|---|---|
| 2005/0177710 A1* | 8/2005 | Rothman | ............ | G06F 9/44505 713/2 |
| 2006/0294149 A1* | 12/2006 | Seshadri | ............. | G06F 12/0646 |
| 2007/0088888 A1 | 4/2007 | Orita | | |
| 2008/0140897 A1* | 6/2008 | Ganguly | ............. | G06F 12/1027 710/268 |
| 2009/0172229 A1 | 7/2009 | Zmudzinski | | |
| 2009/0248934 A1* | 10/2009 | Ge | ......... | G06F 9/4812 710/261 |
| 2009/0327556 A1 | 12/2009 | Railing | | |
| 2012/0159028 A1* | 6/2012 | Zimmer | ................ | G06F 9/4812 710/261 |
| 2012/0166843 A1* | 6/2012 | Muralidhar | ........... | G06F 1/3268 713/323 |
| 2017/0286332 A1* | 10/2017 | Kotary | ..................... | G06F 13/24 |

OTHER PUBLICATIONS

Naveh et al., Power and Thermal Management in the Intel Core Duo Processor. Intel Technology Journal vol. 10, Iss. 02, Published May 15, 2006. Retrieved May 17, 2008 [online]; retreived from <URL:https://pdfs.semanticscholar.org/3197/504e0ebec6aa81f3685b669ceaaf5ef05ce8.pdf> (Year: 2006).*

International Preliminary Report on Patentability received for PCT Patent Application No. PCT/US2017/013450, dated Oct. 11, 2018, 11 pages.

PCT Application No. PCT/US2017/013450, International Search Report and the Written Opinion, dated May 23, 2017, 14 pgs.

* cited by examiner

*Primary Examiner* — Eric T Oberly
(74) *Attorney, Agent, or Firm* — Hanley, Flight and Zimmerman, LLC

(57) ABSTRACT

A method is described. The method includes determining that a first of a plurality of processor cores in a multi-processor computing system has entered an idle state, triggering a SMI for the first processor core, the first processor core entering a system management mode (SMM) and performing one or more platform management operations.

25 Claims, 4 Drawing Sheets

US 10,956,345 B2

ENHANCED DIRECTED SYSTEM MANAGEMENT INTERRUPT MECHANISM

FIELD

Embodiments described herein generally relate to computer systems. More particularly, embodiments relate to processing system management interrupts.

BACKGROUND

The system management mode (SMM) is typically implemented in computing (e.g., server and client) platforms to support various platform level secure/operating system (OS) isolated use cases. SMM is a special mode of operation that is entered by invoking a System Management Interrupt (SMI). In the SMM, an entire processor context is saved in such a way that it can be restored when leaving this mode. Specifically, entering the SMM freezes the execution of the entire OS and places the processor in a special execution context.

Leaving the SMM restores the system state to the state at which operation was being performed prior to the interruption, except for the modifications that were made while in SMM. Examples of SMM usage include server Reliability Availability and Serviceability (RAS) features (e.g., memory hot plug) and client/server basic input output system (BIOS) Unified Extensible Firmware Interface (UEFI) variable services.

A major problem with implementation of SMM/platform management is that server RAS features may take hours to complete SMM operations due to constant time sharing processing cores with an OS stack operating on the cores. The main reason for the extended turnaround time is that modern OSs have stringent timing requirements as to how long a core can be held invisible from the OS. As a result, platform BIOS needs to trigger periodic SMIs to appropriate the processor for a defined threshold period (e.g., <190 usec), execute the platform functionality (e.g. memory hot plug), relinquish the core back to the OS and repeat.

In many cases, such as for multi-processor systems, SMM implementation requires synchronizing all of the system processors to concurrently enter the SMM mode. However for systems with a large number of cores/threads, such synchronization significantly increases the time required for SMM entry/exit, while taking away the use of processors from useful OS operation. This results in server RAS being a less attractive feature, and does not allow the server RAS to be available to enable server availability for meeting application service level agreement (SLA).

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

The present invention may be embodied in systems, apparatuses, and methods for performing an enhanced directed SMM mode, as described below. In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

According to one embodiment, directed SMI handling occurs at processing cores while in an idle state upon a determination that operations are to be performed during a SMM. Accordingly, individual cores may be entered into the SMM. In a further embodiment, completion of an operation being performed at a core during the SMM may be delayed in response to detection of one or more types of events. In this embodiment, the operation is continued upon issuance of a subsequent SMI upon completion of the event.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are microcode, writable control store, and micro-programmed structure.

Figure 1:
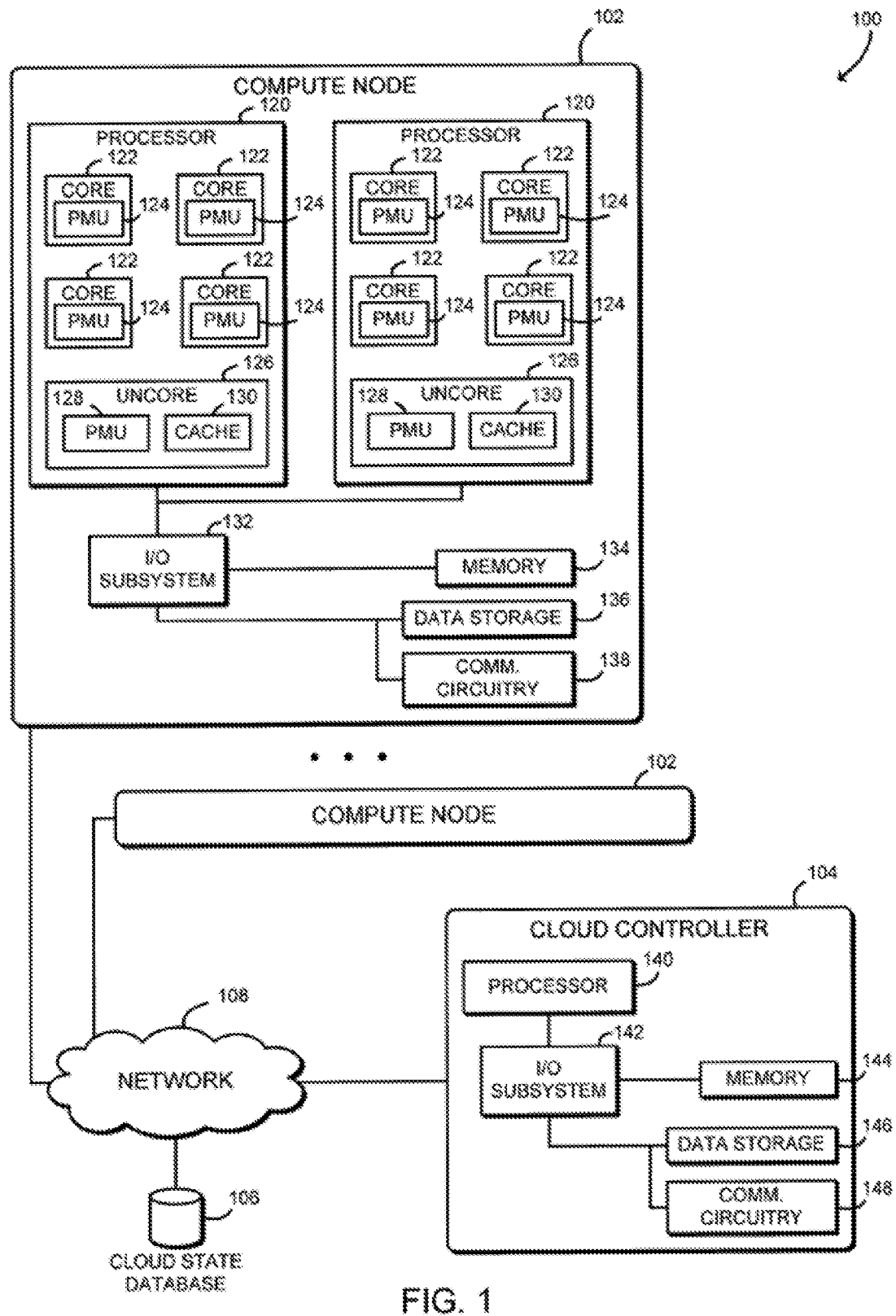
FIG. 1 illustrates one embodiment of a computing system.

FIG. 1 illustrates one embodiment of an information processing system 100. System 100 includes a number of compute nodes 102, a cloud controller 104, and a cloud state database 106, all in communication over a network 108. In use, as discussed in more detail below, each compute node 102 instantiates one or more virtual machines to perform computational tasks. Each compute node 102 monitors its performance, including cache contention, and generates contention and capacity scores. The contention scores for each compute node 102 are stored in the cloud state database 106. The cloud controller 104 monitors the contention scores and schedules new virtual machines based on the reported contention scores of each of the compute nodes 102.

In one embodiment, each compute node 102 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. Each compute node 102 illustratively includes two processors 120, an input/output subsystem 132, a memory 134, a data storage device 136, and communication circuitry 138. Of course, the compute node 102 may include other or additional components, such as those commonly found in a server device (e.g., various input/output devices), in other embodiments. Additionally, in some embodiments, one or more of the illustrative components may be incorporated in, or otherwise form a portion of, another component. For example, memory 134, or portions thereof, may be incorporated in one or more processor 120 in some embodiments.

Each processor 120 may be embodied as any type of processor capable of performing the functions described herein. Each illustrative processor 120 is a multi-core processor, however in other embodiments each processor 120 may be embodied as a single or multi-core processor(s), digital signal processor, microcontroller, or other processor or processing/controlling circuit. Each processor 120 illustratively includes four processor cores 122 and an uncore 126. Each of the processor cores 122 is an independent processing unit capable of executing programmed instructions.

Each processor core 122 includes a performance monitoring unit ("PMU") 124. Each PMU 124 may be embodied as a number of performance counters capable of recording and monitoring the flow of instructions through the respective processor core 122. For example, each PMU 124 may be capable of counting clock cycles, instructions issued, instructions retired, cache misses, or similar events. The PMUs 124 may be programmed to monitor particular performance statistics using model-5 specific registers of the processor core 122. In one embodiment, each PMU 124 may include four fully programmable hardware counters and three fixed-function hardware counters. Software may access the PMUs 124 using a kernel interface such as the "perf" subsystem of the Linux kernel. Although each of the illustrative compute nodes 102 includes two processors 120 having four sockets of 8 processor cores 122; each compute node 102 may include one, two, or more processors 120 having one, two, or more processor cores 122 each in other embodiments. In particular, this disclosure is also applicable to uniprocessor or single-core compute nodes 102.

Each processor 120 also includes an uncore 126. In the illustrative embodiment, each uncore 126 includes any part of the particular processor 120 not included in the processor cores 122 (e.g., all components of the particular processor 120 except for the processor cores 122 themselves). For example, the uncore 126 of each illustrative processor 120 includes a PMU 128 and cache memory 130. Similar to the PMUs 124 of the processor cores 122, the PMU 128 monitors performance statistics of the uncore 126, and may include a number of programmable or fixed-function hardware performance counters. The cache memory 130 may be a last-level cache shared by the processor cores 122. In some embodiments, the PMU 128 may monitor accesses to the cache memory 130, including recording cache misses, amounts of data transferred, and other cache information. Although not illustrated, the uncore 126 may additionally include typical components of a processor or a system-on-a-chip. For example, each uncore 126 may include a memory controller, processor graphics, input/output controllers, power management circuitry, or other components of the processor 120.

The memory 134 may be embodied as any type of volatile or non-volatile memory or data storage capable of performing the functions described herein. In operation, the memory 134 may store various data and software used during operation of the compute node 102 such as operating systems, applications, programs, libraries, and drivers. The memory 134 is communicatively coupled to the processor 120 via the I/O subsystem 132, which may be embodied as circuitry and/or components to facilitate input/output operations with the processor 120, the memory 134, and other components of the compute node 102. For example, the I/O subsystem 132 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 132 may form a portion of a system-on-a-chip (SoC) and be incorporated, along with the processor 120, the memory 134, and other components of the compute node 102, on a single integrated 5 circuit chip.

The data storage device 136 may be embodied as any type of device or devices configured for short-term or long-term storage of data such as, for example, memory devices and circuits, memory cards, hard disk drives, solid-state drives, or other data storage devices. The data storage device 136 may store performance statistics monitored by the compute node 102. The communication circuitry 138 of the compute node 102 may be embodied as any communication circuit, device, or collection thereof, capable of enabling communications between the compute node 102, the cloud controller 104, the cloud state database 106, and/or other remote devices over the network 810. The communication circuitry 138 may be configured to use any one or more communication technology (e.g., wired or wireless communications) and associated protocols (e.g., Ethernet, Bluetooth®, Wi-Fi®, WiMAX, etc.) to effect such communication.

In one embodiment, cloud controller 104 manages virtual machines or other compute instances distributed among the compute nodes 102 of the system 100. Cloud controller 104 may be embodied as any type of server computing device, or collection of devices, capable of performing the functions described herein. As such, cloud controller 104 may be embodied as a single server computing device or a collection of servers and associated devices. For example, in some embodiments, cloud controller 104 may be embodied as a "virtual server" formed from multiple computing devices distributed across network 108 and operating in a public or private cloud. Accordingly, although cloud controller 104 is illustrated in FIG. 1 as embodied as a single server computing device, it should be appreciated that cloud controller 104 may be embodied as multiple devices cooperating together to facilitate the functionality described below.

Illustratively, cloud controller 104 includes a processor 140, an I/O subsystem 142, a memory 144, a data storage device 146, communication circuitry 148, and/or other components and devices commonly found in a server or similar computing device. Those individual components of cloud controller 104 may be similar to the corresponding components of compute nodes 102, the description of which is applicable to the corresponding components of the cloud controller 104 and is not repeated herein so as not to obscure the present disclosure.

Cloud state database 106 stores information that is synchronized across system 100, including performance statistics. Cloud state database 106 may be embodied as a dedicated database server, distributed data storage, or any other data storage system capable of maintaining consistent state for the system 100. As such, copies or portions of cloud state database 106 may be stored in data storage 136 of each compute node 102 and/or the data storage 146 of cloud controller 104. Updated cloud state information may be transferred between compute nodes 102, cloud controller 104, and/or the cloud state database 106 using any communication protocol. In some embodiments, cloud state information may be transferred asynchronously using a message bus, for example a message bus implementing the advanced message queuing protocol (AMQP), such as rabbitmq.

As discussed above, implementing SMM in a multiprocessor system, such as compute node 102, requires synchronizing all of the processor cores 122 to concurrently enter the SMM, which prevents the cores 122 from performing OS operations. Another solution to address SMM limitations is to permanently appropriate a core 122 to handle platform management scenarios under SMM, or for a predetermined period. However, completely appropriating a core from the OS/applications is undesirable since platform management scenarios are very opportunistic and rarely occur. Another scheme is to implement a SMM handler to time share the CPU between OS and platform management entities. However, this solution impacts user experience.

According to one embodiment, directed SMI handling is performed at cores 122 within compute node 102 that are in an idle state from an OS perspective. In this embodiment, the platform trigger SMIs for a core 122 during such idle periods upon a determination that there is pending work. Thus, a core 122 may be individually entered into the SMM. In a further embodiment, completion of an operation being performed at a core 122 during the SMM is delayed in response to detection of certain events. In such an embodiment, the operations are continued upon issuance of a subsequent SMI, once an event is completed. Accordingly, the length of the CPU time slices for SMM mode execution is increased.

Figure 2:
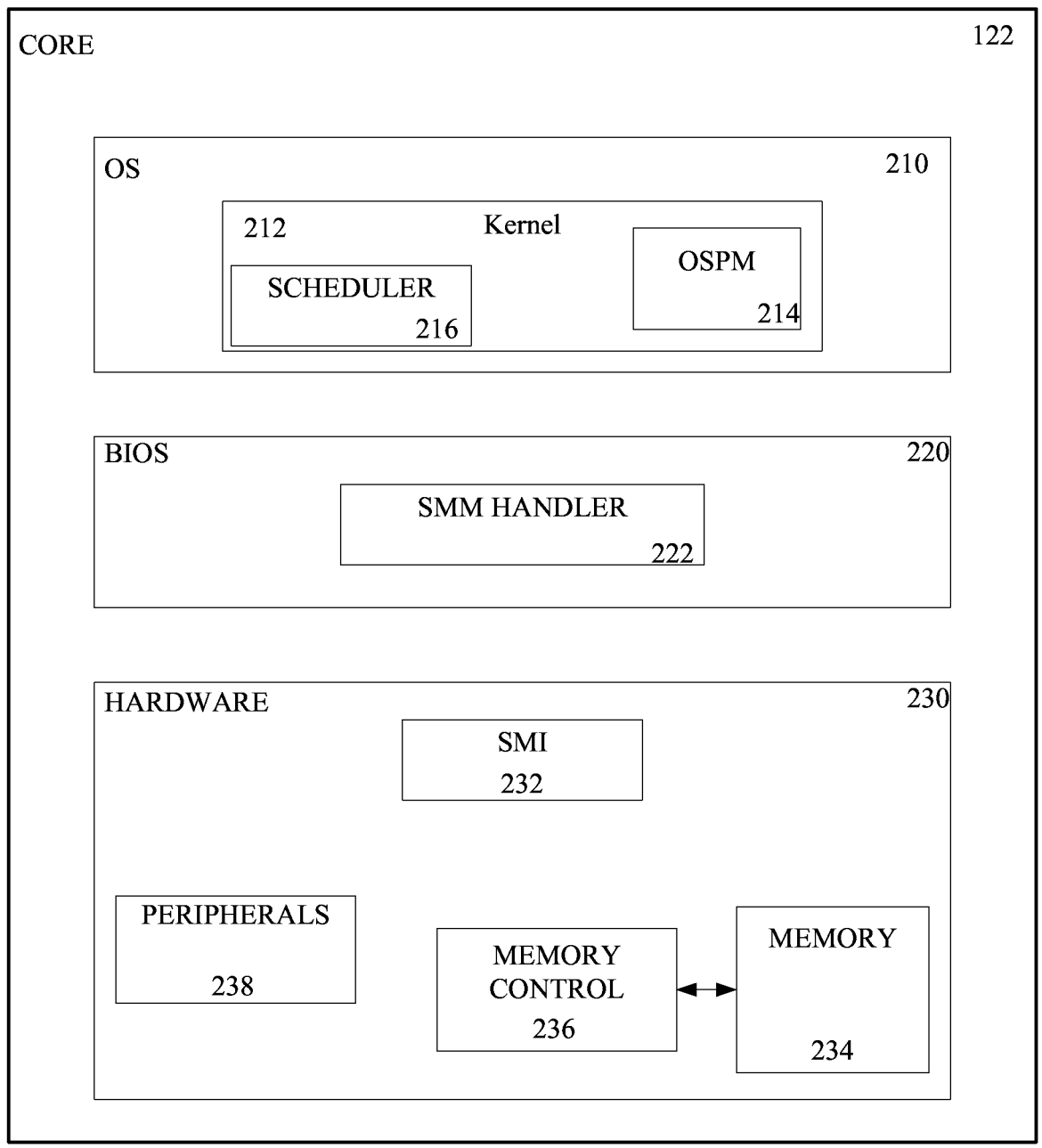
FIG. 2 illustrates one embodiment of a high level functional description of a compute node.

FIG. 2 illustrates one embodiment of a high level functional description of a core 122. As shown in FIG. 2, core 122 includes OS 210, BIOS 220 and hardware 230. OS 210 provides system software for core 122 that manages hardware 230 and software resources. In one embodiment, OS 210 includes kernel 212, which connects application software operating at compute node 102 with hardware 230. Kernel 212 includes operating system power management (OSPM) engine 214.

OSPM engine 214 monitors core 122 to determine if the core is ready to go into an idle state. Further, upon determining a core 122 is ready to go into an idle state, OSPM engine 214 invokes an appropriate mechanism to cause the core 122 to enter the idle state (e.g., Mwait or HLT). Kernel 212 also includes scheduler 216 that is implemented to perform task scheduling for OS 210.

BIOS 220 is firmware used to initialize hardware 230 during a power-on startup, and to provide runtime platform management operations for OS 210. BIOS 220 includes SMM handler 222 that controls system entrance into and exit from the SMM mode. During the SMM mode, BIOS 220 takes control of hardware 230 resources from OS 210. Such resources include memory 234, memory controller 236 and peripherals 238. Hardware 230 also includes SMI unit 232 implemented to issue SMIs.

Figure 3:
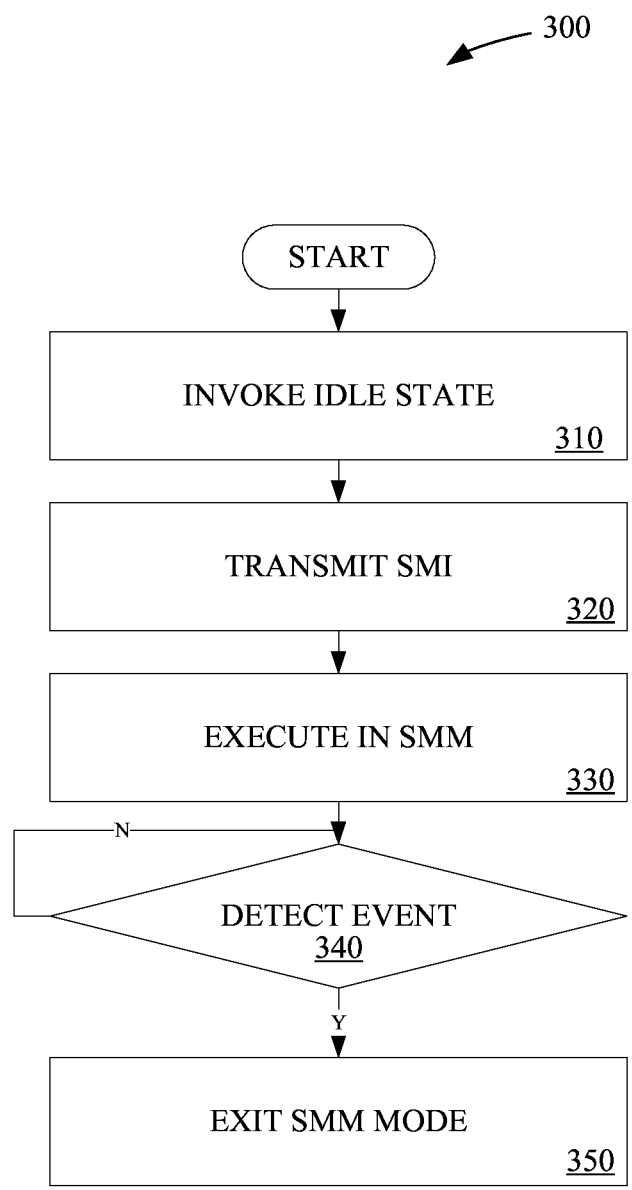
FIG. 3 is a flow diagram illustrating one embodiment of a process to perform an enhanced directed SMM mode.

FIG. 3 is a flow diagram illustrating one embodiment of a process 300 for implementing a directed SMM mode. Method 300 may be performed by processing logic that may comprise hardware (e.g., circuitry, dedicated logic, programmable logic, etc.), software (such as instructions run on a processing device), or a combination thereof. The processes of method 300 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-2 may not be discussed or repeated here.

At processing block 310, OSPM engine 214 determines that a core 122 is ready to go into an idle state, and invokes entry into an idle state (e.g., Mwait or HLT). At processing block 320, SMI unit 232 transmits an SMI to SMM handler 222 upon hardware 230 detecting an idle entry request at core 122. According to one embodiment, this occurs when an SMI pin (or a corresponding hardware assert for SMI on the SoC) has already been asserted to indicate that the system is to run in SMM mode. BIOS 220 executes the SMM mode upon SMM handler 222 receiving the SMI. During this time the associated platform management operations (e.g., memory hot plug) are performed.

At decision block 340, a determination is made as to whether an event has been detected that requires OS 210 to be scheduled on core 122 in order to handle an interrupt or schedule a thread. According to one embodiment, the event may be in response to an I/O device generating a hardware interrupt and I/O advanced Programmable Interrupt Controller (IOAPIC) HW determining that the interrupt destination is set to this core 122. Another event may occur upon detecting that a scheduler 216 operating at another core 122 generates a scheduler dispatch interrupt to this core 122. Additionally, the event may be a Translation Lookaside Buffer (TLB) flush inter-processor interrupt (IPI) that is transmitted to this core 122.

Upon a determination that an event has occurred, SMM handler 222 exits the SMM mode within a predetermined time threshold (e.g., <190 µs), relinquishing control of hardware 230 to OS 210, processing block 350. As discussed above, any work that has not been completed during the SMM mode is delayed until the occurrence of a subsequent SMI. Otherwise, BIOS continues to perform the SMM until an event is detected.

The above-described process enables efficient SMM/platform management for RAS, or other usage that requires use of SMM during OS runtime, especially for systems that have a large number of cores/logical threads.

Figure 4:
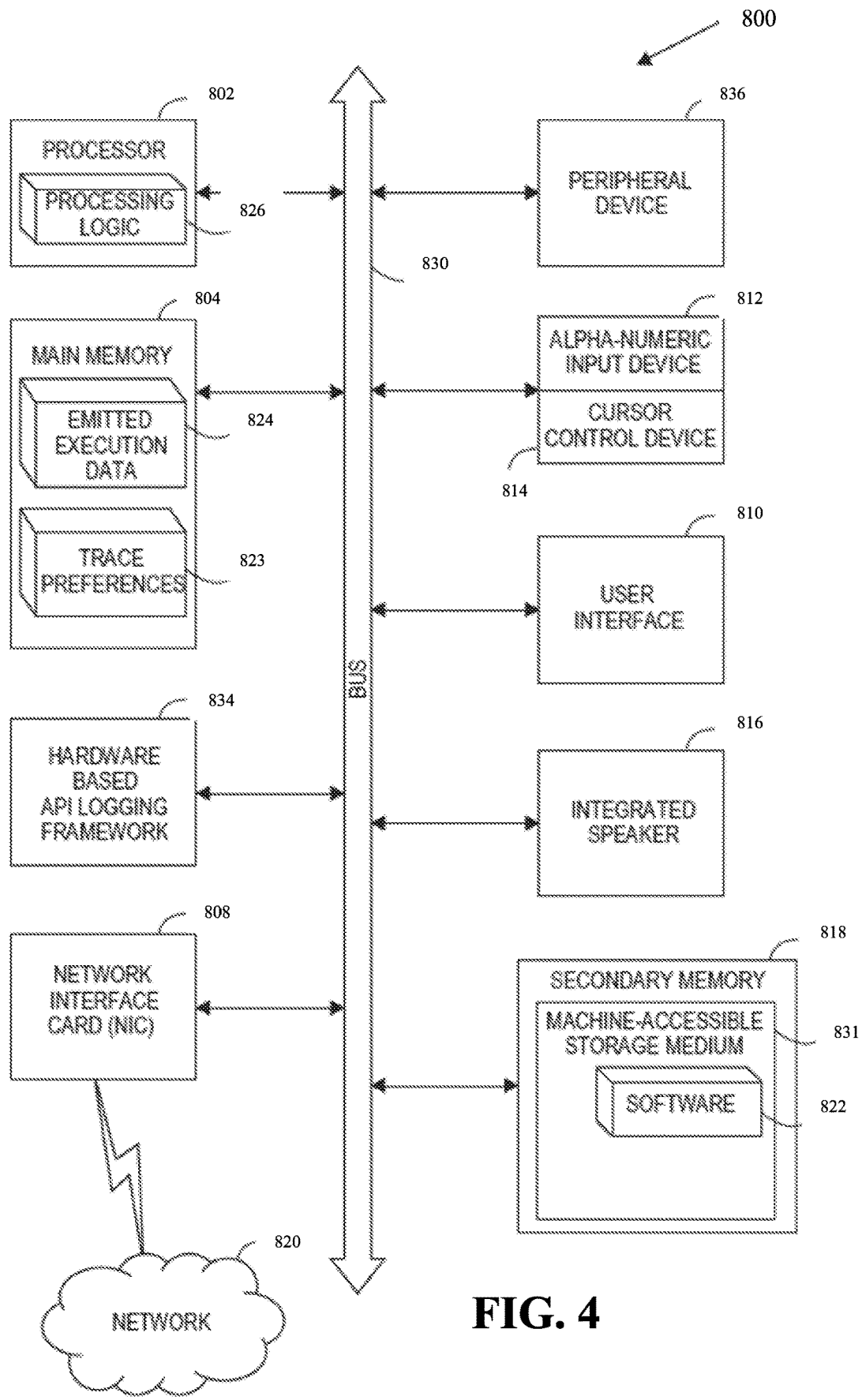
FIG. 4 illustrates one embodiment of a computer system.

FIG. 4 illustrates one embodiment of a computer system 800. The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and persistent multi-tenant data base implementations), which communicate with each other via a bus 830. Main memory 804 includes emitted execution data 824 (e.g., data emitted by a logging framework) and one or more trace preferences 823 which operate in conjunction with processing logic 826 and processor 1002 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality of the above-described mechanism.

The computer system 800 may further include a network interface card 808. The computer system 800 also may include a user interface 810 (such as a video display unit, a liquid crystal display (LCD), or a cathode ray tube (CRT)), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc. The computer system 800 may further include a Hardware based API logging framework 834 capable of executing incoming requests for services and emitting execution data responsive to the fulfillment of such incoming requests.

The secondary memory 818 may include a machine-readable storage medium (or more specifically a machine-accessible storage medium) 831 on which is stored one or more sets of instructions (e.g., software 822) embodying any one or more of the methodologies or functions described above. The software 822 may also reside, completely or at least partially, within the main memory 804 and/or within the processor 802 during execution thereof by the computer system 800, the main memory 1004 and the processor 802 also constituting machine-readable storage media. The software 822 may further be transmitted or received over a network 820 via the network interface card 808. The machine-readable storage medium 831 may include transitory or non-transitory machine-readable storage media.

Portions of various embodiments may be provided as a computer program product, which may include a machine-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals such as carrier waves, infrared signals, digital signals)). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a compute node comprising a plurality of processor cores, each including, an operating system (OS) having an OS power management (OSPM) engine to determine that a first of the plurality of processor cores has entered an idle state and a system management mode (SMM) handler to detect a system management interrupt (SMI) and transition control of hardware resources of the first processor core from the OS to a basic input output system (BIOS) to enter a system management mode (SMM) in order to perform one or more platform management operations.

Example 2 includes the subject matter of Example 1, wherein the SMM handler detects an event indicating an operating system (OS) is to resume control of the first processor core; and exits the SMM to restore control of the OS.

Example 3 includes the subject matter of Examples 1 and 2, wherein the event indicates that the first processor core is an interrupt destination from an input/output (I/O) device.

Example 4 includes the subject matter of Examples 1-3, wherein the event indicates that the first processor core is a destination of a scheduler dispatch interrupt from a second of the plurality of processor cores.

Example 5 includes the subject matter of Examples 1-4, wherein the event indicates that the first processor core is destination for a Translation Lookaside Buffer (TLB) flush inter-processor interrupt (IPI).

Example 6 includes the subject matter of Examples 1-5, wherein the OSPM engine determines that the first processor core has re-entered the idle state.

Example 7 includes the subject matter of Examples 1-6, wherein the SMM handler detects a second SMI and re-enters the SMM in order to resume performance of the one or more platform management operations.

Example 8 includes the subject matter of Examples 1-7, wherein the SMM is exited within a predetermined time threshold.

Example 9 includes the subject matter of Examples 1-8, wherein the OSPM monitors the first processor core to determine whether the core is ready to enter the idle state and cause the first processor core to enter the idle state.

Some embodiments pertain to Example 10 that includes a directed system management interrupt (SMI) method comprising determining that a first of a plurality of processor cores in a multi-processor computing system has entered an idle state, triggering a SMI for the first processor core the first processor core entering a system management mode (SMM) and performing one or more platform management operations.

Example 11 includes the subject matter of Example 10, further comprising detecting an event indicating an operating system (OS) is to resume control of the first processor core and exiting the SMM.

Example 12 includes the subject matter of Examples 10 and 11, wherein the event indicates that the first processor core is an interrupt destination from an input/output (I/O) device.

Example 13 includes the subject matter of Examples 10-12, wherein the event indicates that the first processor core is a destination of a scheduler dispatch interrupt from a second of the plurality of processor cores.

Example 14 includes the subject matter of Examples 10-13, wherein the event indicates that the first processor core is destination for a Translation Lookaside Buffer (TLB) flush inter-processor interrupt (IPI).

Example 15 includes the subject matter of Examples 10-14, further comprising determining that the first processor core has re-entered the idle state, triggering the SMI for the first processor core, the first processor core re-entering the SMM and resuming performance of the one or more platform management operations.

Example 16 includes the subject matter of Examples 10-15, wherein the SMM is exited within a predetermined time threshold.

Example 17 includes the subject matter of Examples 10-16, further comprising monitoring the first processor core to determine whether the core is ready to enter the idle state and causing the first processor core to enter the idle state.

Some embodiments pertain to Example 18 that includes a computer readable medium having instructions, which when executed by one or more processors, cause the processors to perform the methods of claims 1-8.

Some embodiments pertain to Example 19 that includes a computer readable medium having instructions, which when executed by one or more processors, cause the processors to determine that a first of a plurality of processor cores in a multi-processor computing system has entered an idle state, trigger a SMI for the first processor core, enter the first processor core into a system management mode (SMM) and perform one or more platform management operations.

Example 20 includes the subject matter of Example 19, having instructions, which when executed by the one or more processors, further cause the processors to detect an event indicating an operating system (OS) is to resume control of the first processor core and exit the SMM.

Example 21 includes the subject matter of Examples 19 and 20, wherein the event indicates that the first processor core is an interrupt destination from an input/output (I/O) device.

Example 22 includes the subject matter of Examples 19-21, wherein the event indicates that the first processor core is a destination of a scheduler dispatch interrupt from a second of the plurality of processor cores.

Example 23 includes the subject matter of Examples 19-22, wherein the event indicates that the first processor core is destination for a Translation Lookaside Buffer (TLB) flush inter-processor interrupt (IPI).

Example 24 includes the subject matter of Examples 19-23, having instructions, which when executed by the one or more processors, further cause the processors to determine that the first processor core has re-entered the idle state, trigger the SMI for the first processor core, re-enter the first processor core the SMM and resume performance of the one or more platform management operations.

Example 25 includes the subject matter of Examples 19-24, wherein the SMM is exited within a predetermined time threshold.

Example 26 includes the subject matter of Examples 19-25, having instructions, which when executed by the one or more processors, further cause the processors to monitor the first processor core to determine whether the core is ready to enter the idle state and cause the first processor core to enter the idle state.

Some embodiments pertain to Example 27 that includes a directed system management interrupt (SMI) system comprising means for determining that a first of a plurality of processor cores in a multi-processor computing system has entered an idle state, means for triggering a SMI for the first processor core, means for entering the first processor core into a system management mode (SMM) and means for performing one or more platform management operations.

Example 28 includes the subject matter of Example 27, further comprising means for detecting an event indicating an operating system (OS) is to resume control of the first processor core and means for exiting the SMM.

Example 29 includes the subject matter of Examples 27 and 28, wherein the event indicates that the first processor core is an interrupt destination from an input/output (I/O) device.

Example 30 includes the subject matter of Examples 27-29, wherein the event indicates that the first processor core is a destination of a scheduler dispatch interrupt from a second of the plurality of processor cores.

Example 31 includes the subject matter of Examples 27-30, wherein the event indicates that the first processor core is destination for a Translation Lookaside Buffer (TLB) flush inter-processor interrupt (IPI).

Example 32 includes the subject matter of Examples 27-31, means for determining that the first processor core has re-entered the idle state means for triggering the SMI for the first processor core, means for re-entering the first processor core the SMM and means for resuming performance of the one or more platform management operations.

Example 33 includes the subject matter of Examples 27-32, wherein the SMM is exited within a predetermined time threshold.

Example 34 includes the subject matter of Examples 27-33, further comprising means for monitoring the first processor core to determine whether the core is ready to enter the idle state and means for causing the first processor core to enter the idle state.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A compute node comprising:
a plurality of processor cores each including;
an operating system (OS);
an OS power management (OSPM) engine to:
determine that a first processor core of a plurality of processor cores is ready to enter into an idle state, and
invoke entry into the idle state at the first processor core; and a system management mode (SMM) handler to:
detect a system management interrupt (SMI) when the OSPM engine invokes the entry into the idle state at the first processor core, and
transition control of hardware resources of the first processor core from the OS to a basic input output system (BIOS) to enter an SMM in order to perform one or more platform management operations in the SMM using the first processor core.

2. The compute node of claim 1, wherein the SMM handler is to detect an event that indicates the OS is to resume control of the first processor core and to exit the SMM to restore control of the OS.

3. The compute node of claim 2, wherein the event indicates that the first processor core is an interrupt destination from an input/output (I/O) device.

4. The compute node of claim 2, wherein the event indicates that the first processor core is a destination of a scheduler dispatch interrupt from a second of the plurality of processor cores.

5. The compute node of claim 2, wherein the event indicates that the first processor core is destination for a Translation Lookaside Buffer (TLB) flush inter-processor interrupt (IPI).

6. The compute node of claim 1, wherein the OSPM engine is to determine that the first processor core has re-entered the idle state.

7. The compute node of claim 6, wherein the SMM handler is to detect a second SMI and re-enter the SMM in order to resume performance of the one or more platform management operations.

8. The compute node of claim 1, wherein the SMM is exited within a predetermined time threshold.

9. The compute node of claim 1, wherein the OSPM is to monitor the first processor core to determine whether the core is ready to enter the idle state and cause the first processor core to enter the idle state.

10. A directed system management interrupt (SMI) method comprising:
determining, using an operation system power management (OSPM) engine, that a first processor core of a plurality of processor cores in a multi-processor computing system is ready to enter an idle state:
invoking entry into the idle state at the first processor core;
triggering an SMI for the first processor core, responsive to hardware detecting that the OSPM engine has invoked entry into the idle state at the first processor core;
and
performing one or more platform management operations in a system management mode (SMM) using the first processor core.

11. The method of claim 10, further including:
detecting an event indicating an operating system (OS) is to resume control of the first processor core; and
exiting the SMM.

12. The method of claim 11, wherein the event indicates that the first processor core is an interrupt destination from an input/output (I/O) device.

13. The method of claim 11, wherein the event indicates that the first processor core is a destination of a scheduler dispatch interrupt from a second of the plurality of processor cores.

14. The method of claim 11, wherein the event indicates that the first processor core is destination for a Translation Lookaside Buffer (TLB) flush inter-processor interrupt (IPI).

15. The method of claim 10, further including:
determining that the first processor core has re-entered the idle state;
triggering the SMI for the first processor core;
re-entering the first processor core into the SMM; and
resuming performance of the one or more platform management operations.

16. The method of claim 10, wherein the SMM is exited within a predetermined time threshold.

17. The method of claim 10, further including:
monitoring the first processor core to determine whether the core is ready to enter the idle state; and
causing the first processor core to enter the idle state.

18. At least one tangible, non-transitory, computer readable medium having instructions, which when executed by one or more processors, cause the processors to:
determine, using an operating system power management (OSPM) engine, that a first processor core of a plurality of processor cores in a multi-processor computing system is ready to enter an idle state;
invoke entry into the idle state at the first processor core;
trigger an SMI for the first processor core, when hardware detects at the first processor core that the OSPM engine has invoked entry into the idle state at the first processor core;
and
perform one or more platform management operations in a system management mode (SMM) using the first processor core.

19. The computer readable medium of claim 18, having instructions, which when executed by the one or more processors, further cause the processors to:
detect an event indicating an operating system (OS) is to resume control of the first processor core; and
exit the SMM.

20. The computer readable medium of claim 19, wherein the event indicates that the first processor core is an interrupt destination from an input/output (I/O) device.

21. The computer readable medium of claim 19, wherein the event indicates that the first processor core is a destination of a scheduler dispatch interrupt from a second of the plurality of processor cores.

22. The computer readable medium of claim 19, wherein the event indicates that the first processor core is destination for a Translation Lookaside Buffer (TLB) flush inter-processor interrupt (IPI).

23. The computer readable medium of claim 18, having instructions, which when executed by the one or more processors, further cause the processors to:
   determine that the first processor core has re-entered the idle state;
   trigger the SMI for the first processor core;
   re-enter the first processor core into the SMM; and
   resume performance of the one or more platform management operations.

24. The computer readable medium of claim 18, wherein the SMM is exited within a predetermined time threshold.

25. The computer readable medium of claim 18, having instructions, which when executed by the one or more processors, further cause the processors to:
   monitor the first processor core to determine whether the core is ready to enter the idle state; and
   cause the first processor core to enter the idle state.

* * * * *